United States Patent

[11] 3,554,416

| [72] | Inventor | John A. Bott |
| | | 931 Lake Shore Drive, Grosse Pointe Shores, Mich. 48236 |
| [21] | Appl. No. | 707,148 |
| [22] | Filed | Feb. 21, 1968 |
| [45] | Patented | Jan. 12, 1971 |

[54] VEHICLE LUGGAGE RACK
7 Claims, 11 Drawing Figs.

[52] U.S. Cl. .................................................... 224/42.1
[51] Int. Cl. ..................................................... B60r 9/04
[50] Field of Search ......................................... 224/42.1, 29; 280/179; 296/37

[56] References Cited
UNITED STATES PATENTS

| 1,085,572 | 1/1914 | Toepperwein | (224/42.4)UX |
| 1,798,872 | 3/1931 | Ellis | 224/42.1(B) |
| 2,442,266 | 5/1948 | Davis | (224/42.1B)UX |
| 2,739,748 | 3/1956 | Hoover | (224/42.1G)UX |
| 3,152,416 | 10/1964 | MacLean | 224/42.1(A)X |
| 3,253,755 | 5/1966 | Bott | 224/42.1(E) |
| 3,330,454 | 7/1967 | Bott | 224/42.1(E) |

FOREIGN PATENTS

| 758,220 | 10/1956 | Great Britain | 224/42.1B |
| 1,092,494 | 11/1954 | France | 224/42.1E |

Primary Examiner—Gerald M. Forlenza
Attorney—Harness, Dickey & Pierce

ABSTRACT: A roof mounted luggage rack comprising a pair of longitudinally extending spaced parallel side rails, the side rails having longitudinally extending slideway portions provided thereon; a pair of transversely extending cross rails; a pair of slide members mounted one on each end of both of the cross rails and adapted to slidably engage the slideway portions on the side rails for supporting the cross rails for longitudinal sliding movement; a camming lever pivotably mounted on each of the slide members and adapted to clampingly engage the side rails for fixedly securing the cross rails at a preselected longitudinal position thereon, and a plurality of stanchion members operatively supporting the side rails on the associated vehicle, each of the stanchions having an eyelet formed in the upper end thereof adapted to have a suitable restraining strap or tiedown rope secured thereto for use in securing luggage and the like within the rack.

INVENTOR.
John A. Bott
BY Harness, Dickey & Pierce
ATTORNEYS

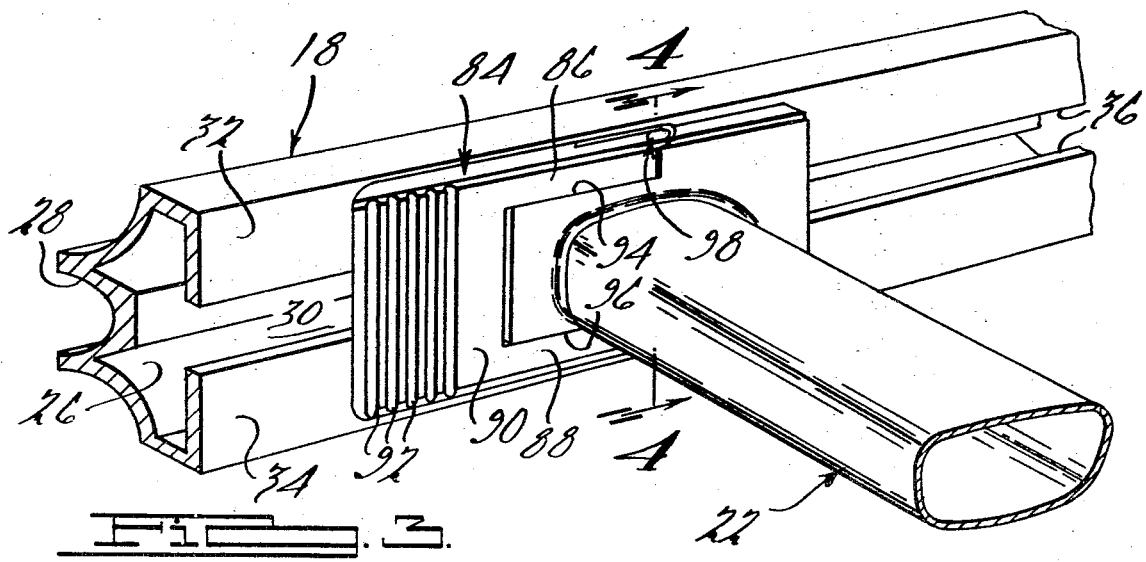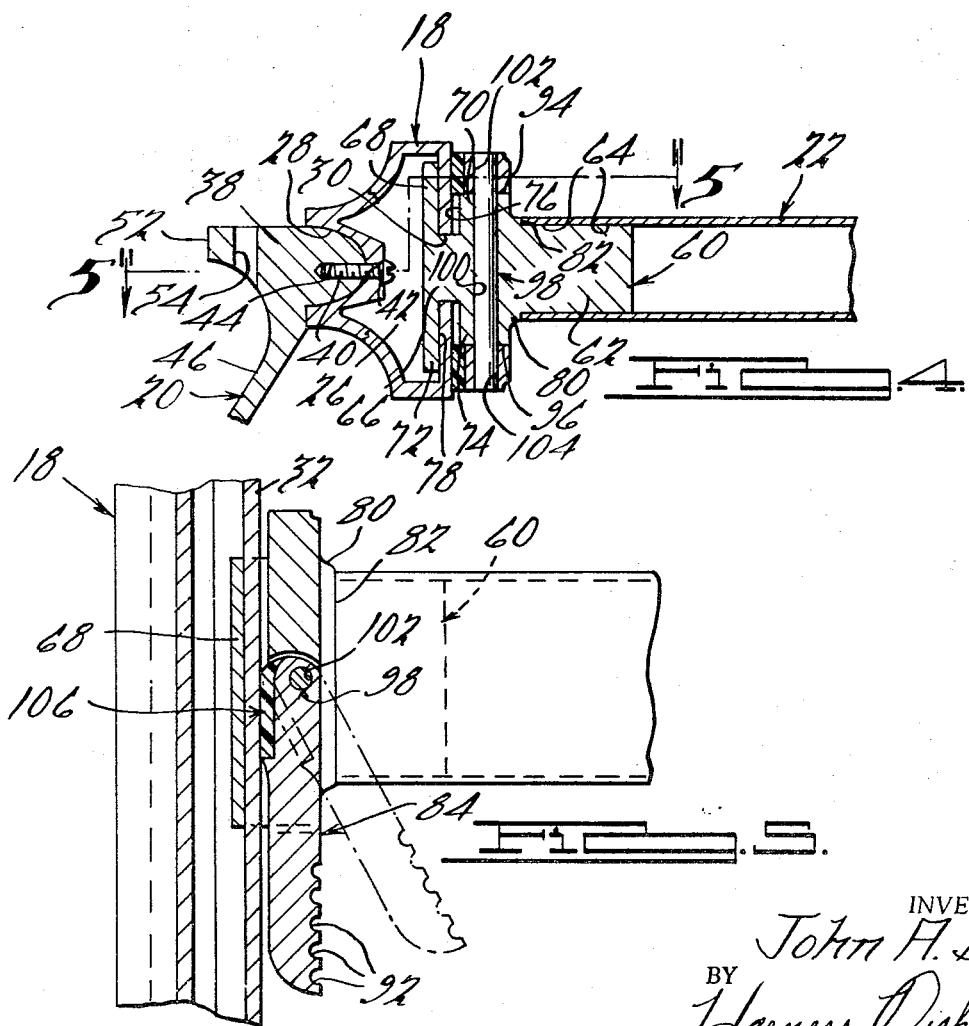

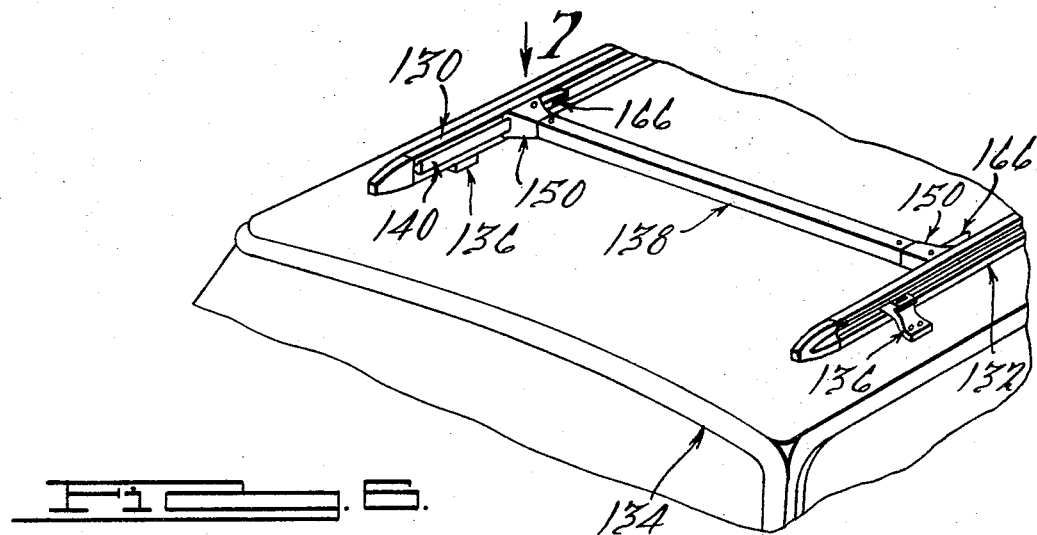
Fig. 6.
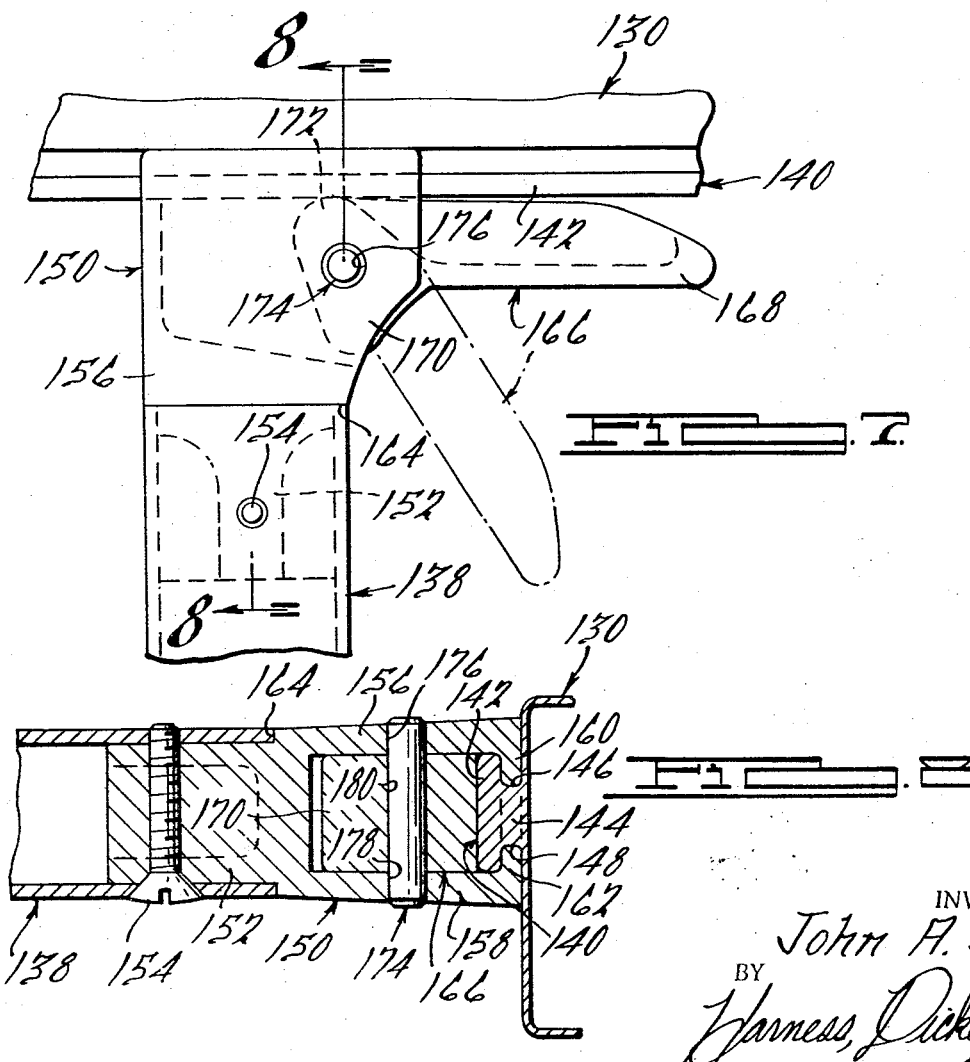
Fig. 7.
Fig. 8.
INVENTOR.
John A. Bott
BY Harness, Dickey & Pierce
ATTORNEYS.

PATENTED JAN 12 1971
3,554,416
SHEET 4 OF 4
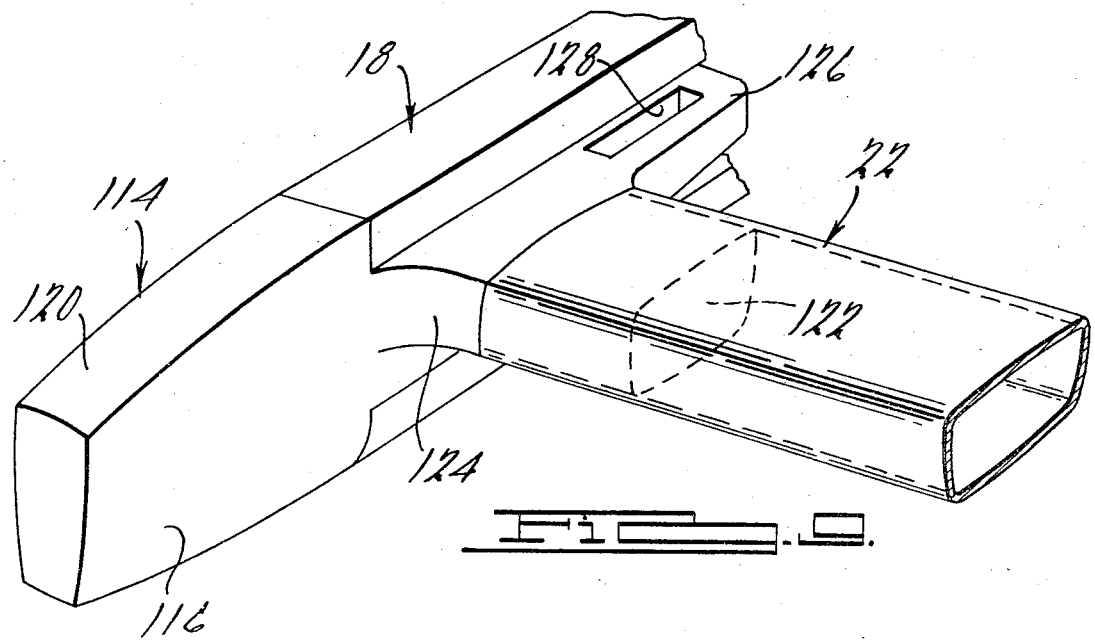
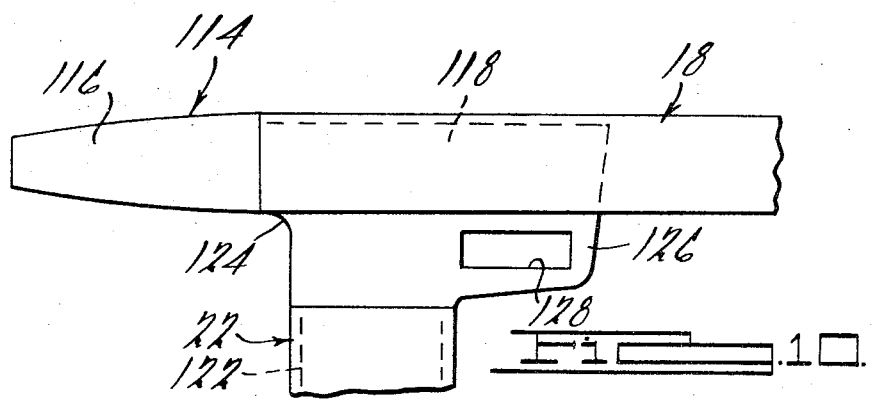
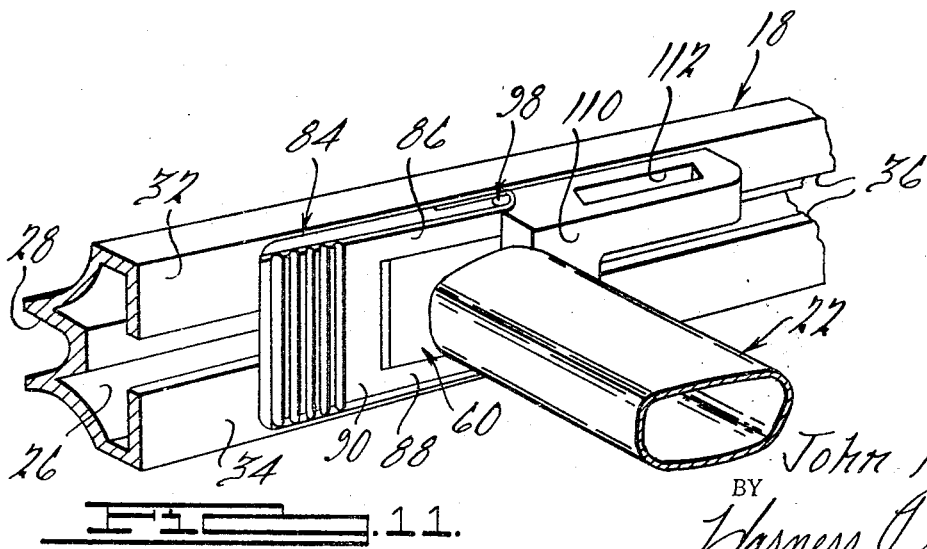
INVENTOR.
John A. Bott
BY Harness, Dickey & Pierce
ATTORNEYS 3,554,416

VEHICLE LUGGAGE RACK

BACKGROUND OF THE INVENTION

In the applicant's Pat. No. 3,253,755, issued May 31, 1966, for "Luggage Rack," a novel luggage rack construction is disclosed comprising a pair of spaced parallel side rails adapted to be rigidly secured to the roof portion or the like of an automotive vehicle. Extending between the side rails is one or more transverse cross rails supported for longitudinal sliding movement relative to the side rails, whereby the cross rail(s) may be longitudinally adjusted in accordance with the size and type of load being transported, thus enabling the load to be effectively supported within the rack. Means for adjustably securing the laterally outer ends of the cross rail(s) to the side rails is provided by a plurality of thumb screws or the like which are adapted to be manually tightened and loosened to permit longitudinal adjustment of the cross rails relative to the associated side rails. Although the luggage rack construction disclosed in the aforementioned patent has found substantial commercial success by virtue of the feature of adjustability of the transversely extending cross rails thereof, the aforesaid means for releasably securing the laterally outer ends of the cross rails to the side rails has been undesirable insofar as difficulty has been involved in tightening and/or loosening the aforementioned thumb screws, thereby rendering the adjustable feature of the rack ineffective.

The luggage rack construction of the present invention provides a novel construction which is adapted to overcome the aforesaid objectionable characteristic of the above described type of luggage rack through the provision of a novel camming lever arrangement provided on the laterally outer ends of the longitudinally adjustable cross rails. The camming levers are pivotably mounted on slide members fixedly secured to the laterally outer ends of the cross rails and adapted to be slidably carried within associated si slideways located on the inboard sides of the side rails. The camming levers are designed to be selectively biased from a first position wherein a pair of substantially resilient and wear resistant clamping members are disengaged from the side rails, thereby permitting free sliding movement of the cross rails, to a second position wherein the clamping members re are positively engaged with the slideways provided on the side rails, thus positively lockingly securing the laterally outer ends of cross rails to the side rails. The camming levers are adapted to be easily manually engageable, thereby providing for effortless movement thereof between the aforesaid locked and unlocked positions, whereby to provide for convenient and rapid adjustment of the cross rails.

The longitudinally extending side rails of the luggage rack embodying the present invention are adapted to be supported upon the associated automotive vehicle by means of a plurality of longitudinally spaced upwardly extending stanchion members, the upper ends of which are provided with means defining openings or eyelets adapted to have the laterally outer ends of tiedown ropes, straps or the like, normally used for restraining movement of the luggage within the rack, tied thereto. By virtue of the fact that the stanchion members are rigidly secured to the roof portion of the associated vehicle, the restraining ropes or straps will be positively precluded from moving longitudinally, as well as laterally, of the vehicle upon being secured within the eyelets.

SUMMARY OF THE INVENTION

This invention relates generally to ma means for carrying luggage or the lie like on automotive vehicles and, more particularly, to a new and improved luggage rack construction adapted to be operatively mounted on the roof portion of an automotive vi vehicle.

It is accordingly a general object of the present invention to provide a new and improved luggage rack construction.

It is a more particular object of the present invention to provide a new and improved luggage rack incorporating at least one laterally extending cross rail supported o for longitudinally sliding movement and incorporating novel means for clampingly securing the laterally outer ends of the cross rail to associated portions of the luggage rack.

It is still a more particular object of the present invention to provide a new and improved luggage rack construction of the above character wherein the aforesaid means for clampingly securing the ends of the cross rail comprises camming lever means pivotally mounted on each end of the cross a rail and adapted to be clampingly engaged with a pair of longitudinally extending side rails.

It is another object of the present invention to provide a luggage rack construction of the above character wherein the camming lever means is pivotably supported on the laterally outer ends of the cross rails and adapted to be manually biased between locked and unlocked positions whereby associated clamping members are positively engaged and disengaged from the adjacent portions of the side rails.

It is still another object of the present invention to provide a new and improved luggage rack construction of the above character incorporating a plurality of longitudinally spaced stanchion members for operatively supporting the side rails on the associated vehicle, which stanchion members are provided with means thereon defining eyelet openings adapted to have associated tiedown ropes or the like secured therewithin.

It is yet another object of the present invention to provide a luggage rack of the above character wherein eyelet defining means is provided adjacent and is longitudinally movable along with the aforesaid camming lever means.

It is another object of the present invention to provide a new and improved luggage rack of the above character which may be constructed of standard components that can be cut to various desired lengths to accommodate luggage racks specifically designed for different vehicles, thereby minimizing the special tooling and accompanying expenses required to fabricate specific luggage racks for each type of vehicle and vehicle model.

It is yet another object of the present invention to provide a new and improved luggage rack of the above character which is adapted to be mounted on vehicles having different shaped roof portions, thereby providing for universality of application.

It is still another object of the present invention to provide a new and improved luggage rack of the above character which particularly lends itself to the use of superior metals which are lightweight, corrosion resistant and pleasant in appearance.

It is still another object of the present invention to provide a luggage rack of the above character which is strong, easily assembled, reasonable in cost, and which is durable in operation.

Other objects and advantages of the present invention will become apparent from the following detailed description, taken in conjunction with the accompanying drawings.

BRIEF DESCRIPTION OF THE DRAWINGS

FIG. 3 is an enlarged fragmentary perspective view of a portion of the structure illustrated in FIG. 1, as seen in the direction of the arrow 3 thereof;

FIG. 4 is a fragmentary cross-sectional view taken substantially along the line 4—4 of FIG. 3;

FIG. 5 is a cross-sectional view taken substantially along the line 5—5 of FIG. 4;

FIG. 6 is an elevated perspective view of an alternate embodiment of the luggage rack of the present invention;

FIG. 7 is a top elevational view of a portion of the luggage rack illustrated in FIG. 6, as taken substantially in the direction of the arrow 7 thereof;

FIG. 8 is a transverse cross-sectional view taken substantially along the line 8–8 of FIG. 7;

FIG. 9 is an elevated perspective view of still another embodiment of the luggage rack of the present invention;

FIG. 10 is a top elevational view of the portion of the luggage rack illustrated in FIG. 9; and FIG. 11 is an elevated perspective view of yet another embodiment of the luggage rack of the present invention.

BRIEF DESCRIPTION OF THE PREFERRED EMBODIMENT

Figure 1:
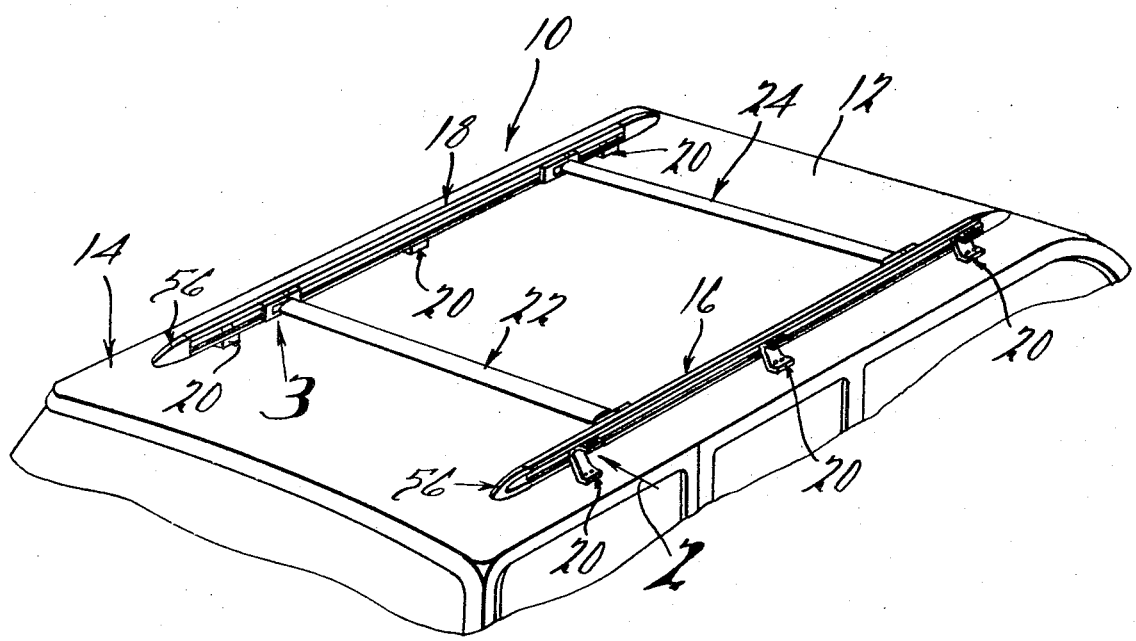
FIG. 1 is an elevated perspective view of the luggage rack f of the present invention as shown in operative association with a conventional automotive vehicle.

Referring now to FIG. 1 of the drawings, a luggage rack 10, constructed in accordance with a preferred embodiment of the present invention, is shown operatively mounted on a substantially flat roof portion 12 of a conventional automotive vehicle 14. Generally speaking, the luggage rack 10 comprises a pair of identical elongated spaced parallel side rails 16 and 18 which extend longitudinally of the roof portion 12 along the opposite sides thereof. The side rails 16, 18 are mounted upon the roof portion 12 by means of a plurality of stanchion members, generally designated 20, and are adapted to support a pair of transversely extending cross rails 22 and 24 for longitudinal sliding movement, whereby the area in which luggage or the like to be carried within the luggage rack 10 may be varied in accordance with the quantity and size of such luggage, as will hereinafter be described.

Figure 2:
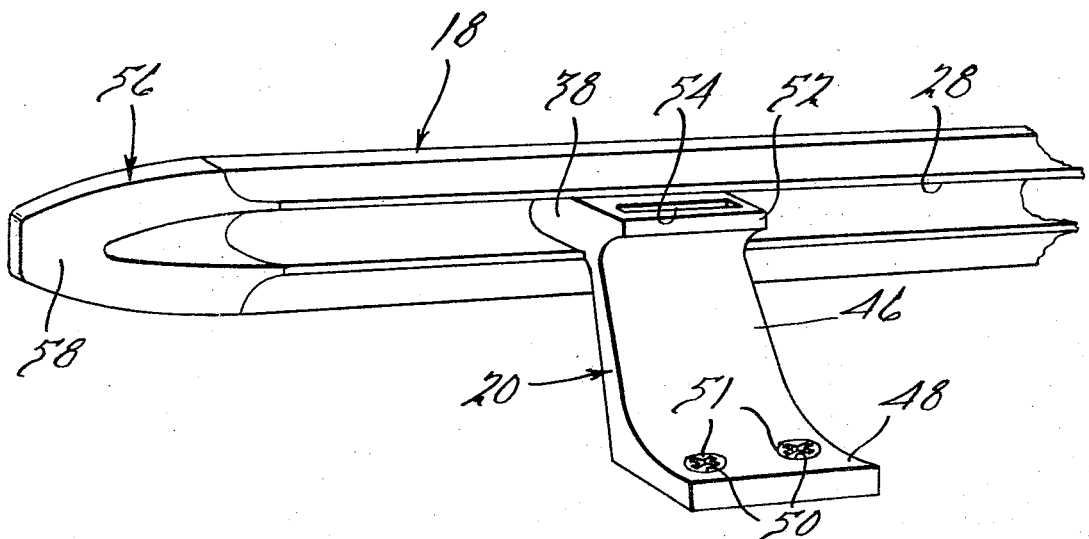
FIG. 2 is an enlarged elevated perspective view of a portion of the luggage rack illustrated in FIG. 1, as seen in the direction of the arrow 2 thereof.

As best seen in FIGS. 2 through 4 the side rails 16, 18 are of a generally hollow construction in transverse cross section and define elongated central cavities 26. The laterally outboard sides of the rails 16, 18 are formed with longitudinally extending, generally U-shaped channel portions 28, while the inboard sides of the rails 16, 18 are formed with longitudinally extending openings 30 that are communicable with the central cavities 26 and above and below which vertically spaced, coplanar arranged vertical flange sections 32 and 34, 4 respectively, are formed. As best illustrated in FIGS. 3 and 4, the flange sections 32 and 34 of each of the side rails 16, 18, define a longitudinally extending slideways slideway 36 which is adapted to function in a manner hereinafter to be described in supporting the cross rails 22 and 24 for longitudinal sliding movement relative to the side rails 16, 18.

Referring now to FIG. 2, it will be seen that the upper ends of the stanchion members 20 are adapted to contiguously engage the outboard sides of the side rails 16 and 18 for purposes of supporting the same on the vehicle roof portion 12. More particularly, the members 20 are formed with laterally inwardly extending upper end sections 38 which are generally U-shaped in transverse section and complementary in shape with respect to the U-shaped channel portions 28 formed along the outboard sides of the side rails 16, 18, whereby the end sections 38 are adapted to be nestingly received within the channel portions 28. It will be seen that since the side rails 16, 18 are of uniform cross section along their entire lengths, the stanchion members 20 are adapted to engage and be rigidly secured to the side rails 16, 18 at substantially any desired longitudinal location therealong, whereby to provide for flexibility and universality of installation. Also, it will be noted that the stanchion members 20 may be pivoted slightly about horizontal or longitudinal axes extending through the upper end sections 38 thereof, such that the flange sections 32, 34 of the side rails 16, 18 will assume a generally vertical attitude regardless of the curvature or "bow" of the roof portion 12 of the vehicle 14. As illustrated in FIG. 4, the upper end sections 38 of the stanchion members 20 are adapted to be fixedly secured within the channel portions 28 of the side rails 16, 18 by means of suitable laterally outwardly extending screws, bolts or the lie like, generally designated 40, which are mounted within suitable laterally outwardly extending bores 42 and 44 formed in the outboard sides of the rails 16, 18 and the inboard sides of the stanchion members 20, suitable access to the screws 40 being provided through the longitudinally extending openings 30 and cavities 26 of the side rails 16, 18. It will be noted that the screws 40 are entirely hidden from view when the luggage rack 10 is observed from the side, thus enhancing the appearance thereof.

Together with the upper end sections 38, each of the stanchion members 20 comprises an integral lateral integral laterally outwardly and downwardly inclined intermediate section 46 that terminates at its lower end in a generally rectangular-shaped base section 48 which, as best illustrated in FIG. 2, is adapted to bear upon the roof portion 12 of the vehicle 14 to support the luggage rack 10 thereon. The base section 48 of each of the stanchion members 20 is formed with suitable countersunk bores 50 through which suitable screws, bolts or the like 51 extend for rigidly securing the stanchion members 20 to the roof portion 12. If desired, suitable a gasket members (not shown) may be provided interjacent the lower sides of the stanchion base sections 48 and the adjacent areas of the roof portion 12, as is common practice in the art.

In accordance with one feature of the present invention, the upper ends of the stanchion members 20 are formed with laterally outwardly extending portions 52 that are substantially horizontally aligned with the upper end sections 38 and are adapted to have substantially vertically extending, longitudinally elongated openings or eyelets 54 formed therein, as best illustrated in FIGS. 2 and 4. The openings 54 are adapted to serve as means for receiving the laterally outer ends of suitable restraining ropes, straps or the like utilized in securing luggage within the luggage rack 10 during cross-country By by virtue of the fact that the stanchion members 20 are rigidly secured to the roof portion 12 at longitudinally spaced locations thereon, any restraining ropes or straps which are tied through the eyelets 54 will be positively prevented from moving o longitudinally of the rack 10, thereby obviating the possibility of the luggage moving within the rack 10 during transport thereof. It will be readily apparent that the number of eyelets 54 adapted for use in tying down luggage within the rack 10 may be increased or decreased in accordance with the number of stanchion members 20, thereby providing for universality of application.

As best illustrated in FIG. 2, the forward and rearward ends of the side rails 16 and 18 may be provided with suitable end cap members, generally designated 56, for enhancing the appearance of the luggage rack 10 of the present invention. The end cap members 56 may be provided with suitable tongue sections (not shown) adapted to be inserted within the ends of the side rails 16, 18 for securing the members 56 to the rails 16, 18. In a preferred construction, the end cap members 56 are preferably of the same general conformation as the side rails 16, 18 with the outermost ends thereof being slightly tapered, as seen at 58.

As previously mentioned, the cross rails 22, 24 are adapted to be supported in the luggage rack 10 such that they re are longitudinally adjustable with respect to the side rails 16, 18. Means for thus supporting the cross rails 22, 24 is provided by a plurality of slide members, generally designated 60, which are disposed one at each end of each of the cross rails 22 and 24. As best illustrated in FIGS. 3 and 4, the slide members 60 comprise laterally inwardly extending mounting sections 62 adapted to be inserted within the lateral outer ends of the cross rails 22, 24 and be fixedly secured to the rein, as by welding or the like as shown at 64 in FIG. 4. Integrally connected to the laterally outermost portions of the mounting sections 62 each of the slide members 60 is a generally H-shaped slide section 66 defining upwardly extending, laterally spaced flange portions 68 and 70 and downwardly extending laterally spaced flange portions 72 and 74. The flange portions 68, 70 and 72, 74 define a pair of vertically spaced, longitudinally extending slide channels 76 and 78, respectively, which are adapted to slidably receive the flange sections 32 and 34 of the side rails 16, 18, as best shown in FIG. 4, whereby the slide members 60 are longitudinally slidable relative to the side rails 16, 18. Preferably, the spacing between the upper end of the channel 78 and the lower end of the channel 76 is substantially equal to the height of the opening 30, thereby minimizing any vertical movement of the slide members 60 relative to the side rails 16, 18. As best shown in FIGS. 3 and 4, the slide members 60 are formed with a fillet section 80 interjacent the slide section 66 and mounting section 62 thereof, which fillet sections 80 define flat shoulder portions 82 adapted to abut against the laterally outer ends of the cross rails 22, 24, whereby to provide a smooth, pleasant appearing juncture of the outer ends of the cross rails 22, 24 and the slide members 60.

In accordance with another feature of the present invention, each of the slide members 60 on the cross rails 22 and 24 is provided with means for clampingly securing the flange sections 32, 34 of the side rails 16, 18 within the associated channels 76 and 78 of the slide members 60, whereby the cross rails 22 and 24 may be fixedly mounted at preselected longitudinal positions along the side rails 16 and 18. Means for thus clampingly securing each end of the cross rails 11 22, 24 is provided by a generally U-shaped camming lever, generally designated 84, which is pivotably mounted on the associated slide member 60. More particularly and as best shown in FIGS. 3 through 5, the camming levers 84 w each comprise a pair of vertically spaced arm sections 86 and 88 which terminate at one end thereof in an enlarged manually engageable intermediate section 90 that is provided with a plurality of suitable grooves or serrations, generally designated 92, which facilitate manual gripping the same. The arm sections 86 and 88 are adapted to be nestingly received within a a pair of longitudinally extending recessed portions 94 and 96 formed along the upper and lower ends of the slide members 60, with the ends of the arm sections 86 and 88 opposite the intermediate section 90 being pivotably secured to the associated slide members 60 by means of suitable vertically extending pivot pins 98. As shown in FIG. 4, the intermediate portions of the pivot pins 98 are disposed within central bores 100 formed in the slide sections 66 of the associated slide members 60, with the upper and lower ends of the pins 98 extending through suitable bores 102 and 104 formed in the arm sections 86 and 88, respectively, of the camming levers 84. With the above construction, it will be seen that the camming levers 84 are adapted to be pivoted between a closed or locked position shown in solid lines in FIG. 5, and an open or unlocked position shown in phantom lines in this FIG.

In order to assure that the flange sections 32 and 34 of the side rails 16 and 18 are positively clampingly secured within the channel sections 76 and 78 of the slide members 60, a pair of clamping members, generally designated 106, are provided on the laterally outboard sides of the arm sections 86 and 88 of each of the camming levers 84 directly adjacent the associated pivot pin 98. The clamping members 106 are preferably constructed of a somewhat deformable yet wear resistant material such as Nylon or Delrin and are designed to be of sufficient thickness such that when the camming levers 84 are biased to their respective closed positions, the clamping members 106 exert a laterally outwardly directed force against the inner sides of the flange sections 32 and 34, thereby compressing the flange sections 32 and 34 between the flange portions 68 and 72 of the slide members 60 and the clamping members 106. The pivot pins 98 of each of the slide members 60 are preferably eccentrically oriented with respect to the clamping members 106 such that when the levers 84 are biased to their respective open positions, the clamping members 106 are disengaged from the laterally inboard sides of the flange sections 32 and 34 of the side rails 16, 18, thus enabling the slide members 60 to be adjusted longitudinally of the rails 16, 18.

FIG. 11 illustrates a slightly modified embodiment of the present invention wherein one of the slide members 60 is provided with an eyelet defining portion, generally designated 110, which is adapted to have a luggage restraining strap or the like (not shown) secured thereto. More particularly, it will be seen that the slide member 60 mounted on the outboard end of the cross rail 22 in FIG. 11 is provided with an integral laterally inwardly extending portion 110 which is located on the longitudinally opposite side of the cross rail 22 from the camming lever 84 and defines a generally vertically extending eyelet 112. It will be noted that as the cross rail 22 is longitudinally adjusted relative to the side rail 18, the eyelet 112 will be moved correspondingly, thereby assuring that the eyelet 112 will always be disposed directly adjacent the cross rail 22, regardless of the particular longitudinal position thereof, whereby to assure for positive luggage securing within the luggage rack 10.

In operation, luggage or the like is placed within the confines of the luggage rack 10, and the camming levers 84 on each of the slide members 60 is biased to its respective open position, thereby disengaging the clamping members 106 from the flange sections 32 and 34 on the side rails 16, 18. Thereafter, the cross rails 22, 24 may be longitudinally adjusted with respect the side rails 16 and 18 to provide for optimum support of the luggage placed within the rack 10. After the cross rails 22 and 24 have been properly positioned, the camming levers 84 are biased to their respective closed positions, whereby the clamping members 106 are biased laterally outwardly, resulting in the flange sections 3 and 34 of the side rails 16 and 18 being positively clamped between the flange portions 68 and 72 of the slide members 60 and the associated clamping members 106, thus firmly locking the cross rails 22 and 24 in position. If desired, suitable restraining straps or ropes may then be used to tie the baggage within the rack 10, with the ends of such ropes or straps being secured to the eyelets 54 of the stanchion members 20, or to the eyelet 112 provided on the slide members 60, as above described.

For certain applications, it may be desirable that one of the cross rails 22, 24 be fixedly secured at its opposite ends to the side rails 16 and 18, in which case only one of the cross rails 22, 24 would be longitudinally adjustable. Means for thus fixedly securing one of the cross rails 22, 24 is shown in a slightly modified embodiment of the present invention in FIGS. 9 and 10 wherein one end of the cross rail 22 is shown fixedly secured to the adjacent side rail 18. In this embodiment of the luggage rack of the present invention, the means for securing the end of the cross rail 22 to the side rail 18 is provided by an end cap member, generally designated 113 114, comprising an end portion 116 extending longitudinally outwardly from the end of the side rail 18, and a longitudinally extending mounting or "tongue" portion 116 extending longitudinally outwardly from the 118 which is adapted to be telescopically received or inserted within the cavity 26 of the side rail 18. As illustrated in FIGS. 9 and 10, the end portion 116 of the cap member 114 has substantially the same conformation as the exterior of the side rail 18, whereby to provide a smooth attractive appearing joint therebetween. If desired, the longitudinally outer end of the end portion 116 may be tapered, as seen at 120 to enhance the appearance of the end cap member 114.

As best seen in FIGS. 9 and 10, the tongue portion 118 of the end cap member 114 comprises a laterally inwardly extending section 122 which is adapted to be inserted within the adjacent end of the cross rail 22, whereby to fixedly secure the end of the cross rail 22 to the end cap member 113 114. The section 122 may be secured within the end of the cross rail 22 by any suitable means, such as by welding or by suitable screws, bolts or the lie like (now shown). A generally smooth, arcuate fillet portion 124 is preferably provided between the section 122 and the end portion 116 for purposes of enhancing the appearance of the end cap member 114.

At a position laterally inwardly from the inboard side of the side rail 18 and longitudinally forwardly from the cross rail 22, the end cap member 114 is provided with an eyelet defining portion 126 which defines a generally vertically extending opening or eyelet 128 through which suitable luggage restraining straps or the like may be inserted for securing luggage within the associated luggage rack. It will be noted that the eyelet 128 is oriented directly adjacent the cross rail 22 so as to be readily accessible for securing u luggage within the luggage rack 10.

Referring now to FIGS. 6 through 8, another slightly modified embodiment of the luggage rack of the present invention is shown as comprising a pair of side rails 130 and 132 that are adapted to be supported upon an associated automotive vehicle 134 by means of suitable stanchions or the like 136. Extending laterally between the side rails 130, 132 is elongated cross rail 138 which is adapted to be longitudinally adjusted along the side rails 130, 132 in accordance with the size and type of luggage to be transported on the vehicle 134. With the exception of the slideway means provided on the inboard sides of the side rails 130, 132 and the means provided on the outboard ends of the cross rail 138 adapted to slidably engage said slideway means, the rails 130, 132 and 138, as well as the stanchions 136 are substantially the same construction as the analogous of the components of the luggage rack 10 as discussed in connection with FIGS. 1 through 5.

As best illustrated in FIGS. 7 and 8, the laterally inboard sides of the side rails 130, 132 are provided with longitudinally extending, generally T-shaped slideways 140 which comprise generally vertically disposed slide portions 142 that are integrally connected to the inboard sides of the rails 130, 14 132 by means of horizontally disposed web or connecting portions 144. The slide portions 142, 144 define a pair of vertically spaced, longitudinally extending channels 146 and 148 which are coextensive of the side rails 130 and 132.

The slideways 140 are adapted to be slidably engaged by a pair of slide members 150 fixedly secured to the laterally outer ends of the cross rail 138 and each comprising a laterally inwardly extending mounting section 152 adapted to be inserted within one of the laterally outer ends of the cross rail 138 and be fixedly secured therewithin by means of suitable screws, bolts or the like 154. Each of the slide members 150 comprises a pair of generally horizontally extending, vertically spaced sections 156 and 158 (see FIG. 8) which terminate at their laterally outer ends in vertically extending flange portions 160 and 162 that are slidably received within the channels 146, 148, respectively, of one of the slideways 140, whereby the slide members 150 are slidably secured to the slideways 140 to enable the cross rail 138 to be longitudinally moved relative to the side rails 130, 132. Preferably, the vertical spacing between the channels 146 and 148 is substantially equal to the distance between the confronting portions of the flanges 160 and 162, whereby to minimize any vertical movement of the slide members 150 relative to the side rails 130, 132. As was the case with the aforediscussed slide members 60, the members 150 define generally flat shoulder portions 164 adapted to abut against the laterally outer ends of the cross rail 138, whereby to provide a smooth, pleasant appearing juncture between the outer ends of the rail 138 and the slide members 150.

Each of the slide members 150 is provided with a pivotally mounted camming member 166, that comprises a longitudinally extending, manually engageable section 168, a pivot section 170 which is interposed between the vertically spaced sections 156 and 158, and a camming section 172 that is adapted to be clampingly engaged with the laterally inner side of one of the slide portions 142. As best seen in FIG. 8, the pivot sections 170 of the camming members 166 are pivotally mounted by means of generally vertically extending pivot pins 174 which extend through openings 176 and 178 in the sections 156, 158, respectively, and through suitable vertically extending bores 180 in the members 166. With this construction, it will be seen that the camming members 166 are adapted to be pivoted between a closed position, as shown by the solid lines in FIG. 7, and an open position as shown by the phantom lines in FIG. 7. The bore 180 is oriented within the camming members 166 in a manner such that the camming sections 172 are eccentrically oriented with respect to the axis of the pins 174. Accordingly, when the camming members 166 are disposed in the solid line positions, the camming sections 172 thereof exert an outwardly directed force thereby compressing the slide portions 142 of the slideways 140 between the camming members 166 and the flanges 160, 162 of the slide members 150. At such time as it is desired to adjust the cross rail 138 longitudinally of the side rails 130, 132, the camming members 166 are biased to the phantom line position shown in FIG. 7, thereby disengaging the camming sections 172 thereof from the laterally inner sides of the slide portions 142. It will be apparent, of course, that once the cross rail 136 has been moved to some preselected longitudinal position, the camming members 166 may be biased to their respective closed positions, thereby fixedly securing the cross rail 138 relative to the side rails 130, 132.

It will be seen from the foregoing description that the present invention provides a novel luggage rack construction which is of a extremely simple design and therefore is economical to manufacture and easy to assemble. It will also be seen that the luggage rack of the present invention is readily adapted to be mounted on virtually all types of vehicles and may have the laterally extending cross rails thereof conveniently moved to preselected longitudinal positions and thereafter positively locked in said positions to provide for the optimum support of any luggage or the like carried within the rack, such support being enhanced by the provision of a plurality of eyelets which are integrally formed on the associated stanchions to facilitate securing the luggage within the rack by means of suitable restraining straps, ropes or the like. Preferably, the various component parts of the luggage rack 10 of the present invention are fabricated of aluminum or a similar lightweight, noncorrosive material, resulting in a luggage rack that e requires relatively ll low cost tooling and which has a minimum structurally accrued weight. Such a material also provides an assembly which is extremely pleasant in appearance.

I claim:

1. In a rack for carrying luggage or the like on an automotive vehicle:
   a pair of longitudinally extending spaced parallel side rails;
   said side a rails having a pair of longitudinally extending recessed portions defining slideway elements along the laterally inner sides thereof;
   at least one cross rail extending transversely between said side rails;
   a pair of slide elements disposed one on each end of said cross rail for adjustably securing said cross rail to said side rails;
   one of said mentioned pairs of said slideway elements and said slide elements defining a pair of longitudinally extending flange sections and the other of said mentioned pair of elements defining a pair locking sections extending generally parallel to a said flange sections and adapted for longitudinal sliding engagement therewith,
   a pair of camming lever members pivotally mounted one on each end of said cross rail; and
   said camming lever members having manually engageable portions and clamping portions, with said first mentioned portions being manually movable between a first position wherein said second mentioned portions clampingly said flange sections to said locking sections and thereby secure said cross rail against longitudinal movement relative to said side rails, and a second position wherein said second portions of said camming members release said flange sections from clamping engagement with said locking sections and thereby permit adjustment of said cross rail longitudinally of said side rails.

2. A luggage rack as set forth in claim 1 wherein said camming lever members include eyelet defining means which are movable longitudinally of said side rail member along with said cross rail member.

3. A luggage rack as set forth in claim 1 which includes eyelet defining portions on said slide elements disposed directly adjacent said camming lever members and movable longitudinally of said side rail member concomitantly with said slide elements.

4. In a rack for carrying luggage and the like:

at least one longitudinally extending side rail member;

said side rail member including a pair of spaced, coplanar flange sections;

at least one transversely extending cross rail member;

a slide member defining first and second recessed portions adapted to slidably receive a said flange sections for supporting said cross rail for longitudinal sliding movement relative to said side rail;

means for adjustably securing one end of said cross rail member to said side rail member comprising camming means movably secured to said one of said members and adapted to clampingly engage a portion of the other of said members;

said camming means comprising a camming lever pivotally mounted on said slide member about an axis extending generally at right angles to said cross rail member and arranged exteriorly of said side and cross rail members so as to be manually accessible for pivotable movement between clampingly engaged and disengaged positions; and said camming lever having a manually engageable portion and a clamping portion, with said first mentioned portion being manually movable between a first position wherein said second mentioned portion clampingly secures said slide member to said flange sections of said side rail and a second position wherein said second mentioned position permits said cross rail to be adjusted longitudinally of said side rail.

5. In a rack for carrying luggage and the like:

at least one longitudinally extending side rail member;

said side rail comprising an inwardly projecting and longitudinally extending slideway portion;

at least one transversely extending cross rail member;

a slide member on one end of said cross rail adapted to slidably engage said slideway portion on said side rail;

means for adjustably securing one end of said cross rail member to said side rail member comprising camming means movably secured to said one of said members and adapted to clampingly engage a portion of the other of said members; and said camming means comprising a camming lever pivotally mounted on said slide member about an axis extending generally at right angles to said cross rail member and arranged exteriorly of said side and cross rail members so as to be manually accessible for pivotable movement between clampingly engaged and disengaged positions.

6. A luggage rack as set forth in claim 5 wherein said slideway portion on said side rail comprises a generally T-shaped slideway disposed on the laterally inboard side of said one of said side rail, and which includes a slide member having flange portions of substantially complementary shape with respect to said slideway and adapted to be slidably engaged therewith.

7. A luggage rack as set forth in claim 6 which includes a camming member pivotably connected to said slide member directly adjacent said flange portions and having a camming portion adapted to be biased into clamping engagement with said slideway upon preselected pivotal movement thereof.

UNITED STATES PATENT OFFICE
CERTIFICATE OF CORRECTION

Patent No. 3,554,416      Dated   January 12, 1971

Inventor(s)  JOHN A. BOTT

It is certified that error appears in the above-identified patent and that said Letters Patent are hereby corrected as shown below:

Column 1, line 5, delete "9" at the end of the line.
Column 1, line 38, after "associated", delete "si".
Column 1, line 44, after "members", delete "re".
Column 1, line 69, after "to", delete "ma".
Column 1, line 70, before "like", delete "lie".
Column 1, line 74, before "vehicle", delete "vi".
Column 2, line 3, before "for", delete "o".
Column 2, line 11, after "cross", delete "a".
Column 2, line 61, after "rack", delete "f".
Column 3, line 41, after "34", delete "4".
Column 3, line 43, after "extending", delete "slideways".
Column 3, line 73, before "like", delete "lie".
Column 4, line 17, after "suitable", delete "a".
Column 4, line 32, after "cross-country", insert -- traveling. --.
Column 4, line 32, after "By", delete "by".
Column 4, line 36, before "longitudinally", delete "o".
Column 4, line 55, after "they", delete "re".
Column 4, line 63, "lateral" should be -- laterally --.
Column 4, line 64, after "secured", delete "to the rein" and
          insert -- therein --.
Column 4, line 67, after "62", insert -- of --.
Column 5, line 19, after "rails", delete "11".
Column 5, line 24, after "84", delete "w".
Column 6, line 18, after "respect", insert -- to --.
Column 6, line 23, after "sections", delete "3" and insert -- 32 --.
Column 6, line 43, after "designated", delete "113".
Column 6, line 46, delete "116 extending longitudinally outwardly
          from the".

Continued on Page 2

UNITED STATES PATENT OFFICE
CERTIFICATE OF CORRECTION

Patent No. 3,554,416      Dated January 12, 1971

Inventor(s) JOHN A. BOTT

It is certified that error appears in the above-identified patent and that said Letters Patent are hereby corrected as shown below:

Page 2

Column 6, line 61, after "member", delete "113".
Column 6, line 64, after "the", delete "lie".
Column 7, line 24, after "130", delete "14".
Column 8, line 9, after "rail", delete "136" and insert -- 138 --.
Column 8, line 30, after "that", delete "e".
Column 8, line 31, after "relatively", delete "11".

Claim 1, column 8, line 39, after "side", delete "a".
Claim 1, column 8, line 49, after "pair", insert -- of --.
Claim 1, column 8, line 51, after "to", delete "a".
Claim 1, column 8, line 58, after "clampingly", insert -- secure --.
Claim 4, column 9, line 6, after "receive", delete "a".

Signed and sealed this 7th day of September 1971.

(SEAL)
Attest:

EDWARD M. FLETCHER, JR.　　　　　ROBERT GOTTSCHALK
Attesting Officer　　　　　　　　　Acting Commissioner of Pater